March 4, 1952 C. G. HERBST 2,588,322
WEIGHING SCALE
Filed April 16, 1948
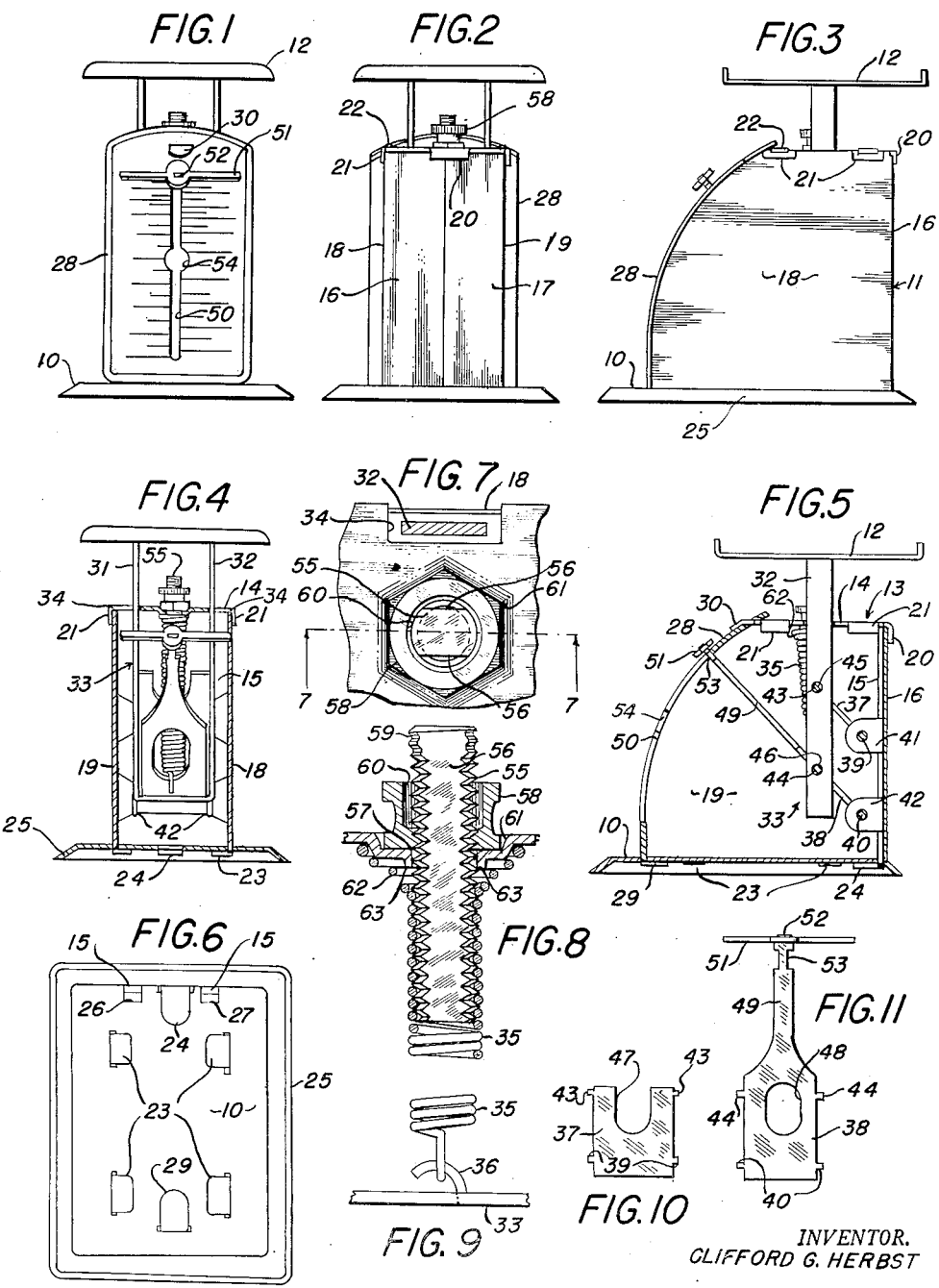
INVENTOR.
CLIFFORD G. HERBST
BY H. G. Manning
ATTY.

Patented Mar. 4, 1952

2,588,322

UNITED STATES PATENT OFFICE 2,588,322

WEIGHING SCALE

Clifford G. Herbst, Waterbury, Conn., assignor to The Eastern Metalcraft Company, Incorporated, Waterbury, Conn., a corporation of Connecticut Application April 16, 1948, Serial No. 21,531

1 Claim. (Cl. 265—27)

This invention relates to weighing scales, and more particularly to a scale of this type having a spring-supported platform and a pointer which will move over a graduated curved scale plate.

One object of this invention is to provide a device of the above nature which includes improved means for adjustably supporting the spring, and in which the platform is pivotally connected to said pointer and to a forked pivot plate parallel thereto.

Another object is to provide a device of the above nature having pivot lugs formed integral with the pointer and forked plate, whereby the cost of manufacture will be reduced and assembly will be facilitated.

Another object is to provide a device of the above nature which includes an adjustable L-shaped bracket for supporting the scale mechanism, whereby the proper alignment of the mechanism may be easily obtained.

A further object is to provide a device of the above nature which will be simple in construction, inexpensive to manufacture, accurate, easy to assemble and adjust, compact, ornamental in appearance, very efficient and durable in use, and which will maintain its adjustment.

With these and other objects in view, there has been illustrated on the accompanying drawing one form in which the invention may conveniently be embodied in practice.

In the drawing,

Fig. 1 is a front elevation of the improved scale.

Fig. 2 is a rear elevation of the same,

Fig. 3 is a side elevation of the same.

Fig. 4 is a front elevation of the scale mechanism, with the base and the casing shown in section.

Fig. 5 is a side elevation of the same, with the base and the casing shown in section.

Fig. 6 is a bottom view of the scale.

Fig. 7 is a fragmentary plan view showing the spring-adjusting means.

Fig. 8 is a sectional view, taken substantially on the line 7—7 of Fig. 6, showing the adjustable screw stud.

Fig. 9 is a fragmentary front view showing the connection of the spring with the yoke.

Fig. 10 is a view of the upper fork plate.

Fig. 11 is a view of the pivoted pointer-carrying plate and pointer arm formed thereon.

Referring now to the drawing in which like reference numerals denote correspoinding parts throughout the several views, the improved scale comprises a base 10 which supports a casing 11 and a weighing pan 12.

The working mechanism of the scale is carried by an L-shaped bracket 13 comprising a horizontal top plate 14 which serves as the top wall of the casing 11, and a vertical back plate 15.

The back plate 15 is supported in engagement with the inner surfaces of a pair of abutting inturned rear flanges 16, 17 of parallel casing side walls 18, 19, respectively. The top plate 14 of the bracket 13 is provided with a depending ear 20 at its rear edge which engages over the upper edges of the inturned flanges 16, 17, and has a plurality of side ears 21, 21 which engage over the upper edges of the casing side walls 18, 19.

The side walls 18, 19 are provided with ears 22 at their upper edges which pass through the top plate 14, and a plurality of ears 23 at their lower edges which are engaged through the base 10. The back plate 15 of the bracket 13 also is provided with a single central ear 24 at its lower edge, engaged through the base 10, said base being provided with a downturned inclined peripheral flange 25, which serves to support the ears 23, 24 out of contact with the surface upon which the scale rests, and also to reinforce the base 10. It will thus be seen that the base 10, the L-shaped bracket 13, and the casing side walls 18, 19 are firmly secured together as a rigid unit.

It will be noted that the base 10 is provided with a pair of apertures 26, 27 at each side of the ear 24, which provide access to lower edge portions of the back plate 15 of the bracket 13. The purpose of these apertures will be described hereinafter.

The front wall of the casing 11 consists of a curved scale plate 28 which is secured against the curved front edges of the side plates 18, 19, by means of a bottom ear 29 which is engaged through the base 10, and an ear 30 on the front edge of the top plate 14 which passes through the scale plate 28.

The scale pan 12 is carried above the casing 11 upon the upper ends of a pair of parallel vertical legs 31, 32 of a U-shaped yoke 33 formed of flat metal material. A pair of slots 34 is provided in opposite edges of the top plate 14 in order to provide clearance for free vertical movement of the legs 31, 32.

The U-shaped yoke 33 is supported within the casing 11 by means of a helical coiled weighing spring 35 which has its lower looped end engaged with a hook 36 struck up from the center portion of the yoke 33 and which is supported at its upper end by means to be described hereinafter.

It will be understood that a weight placed upon the scale pan 12 will cause vertical movement of the yoke 33 to produce a proportional deflection of the weighing spring 35.

In order to maintain the yoke 33 upright at all times, provision is made of an upper short fork plate 37 and a lower elongated pointer-carrying plate 38, which plates are pivotally attached to the yoke 33 and to the back plate 15 of the bracket 13 in a parallelogram arrangement.

The attachment of the plates 37, 38 to the back plate 15 is by means of two pairs of integral flat side pivot lugs 39 and 40, which are engaged in pairs of apertured ears 41, 42 respectively, bent inwardly from opposite edge portions of the back plate 15.

The attachment of the plates 37, 38 to the yoke 33 is by means of two pairs of integral flat side pivot lugs 43, 44, which are engaged in upper and lower pairs of apertures 45, 46, respectively, in the vertical legs 31, 32, of the yoke 33.

It will be seen that the plates 37, 38 are of such a width as to hold the yoke 33 against substantial lateral deflection, whereby the yoke legs 31, 32 will be prevented from engaging the sides of the slots 34 and the side walls 18, 19, and interfering with the operation of the scales.

In order to provide full clearance for operation of the weighing spring 35, an open notch 47 and an oval-shaped aperture 48 are provided in the upper and lower fork plates 37, 38, respectively. The lower pointer-carrying plate 38 is extended forwardly in the form of a pointer arm 49 which passes outwardly through a vertical slot 50 in the curved scale plate 28, and carries a double-ended horizontal pointer 51 at its outer end. Thus, the pointer 51 will move freely over the scale plate 28 to indicate the weight resting upon the scale pan 12.

The end of the pointer arm 49 will preferably be headed over at 52 in order to retain the pointer 51, and is formed with a reduced neck 53 behind the pointer 51, whereby the arm 49 is adapted to move freely in the slot 50. The slot 50 is provided with a central circular enlargement 54, which will facilitate the passage of the scale plate 28 over the pointer 51 during the assembly operation.

Referring now to Figs. 8 and 9. it will be seen that the weighing spring 35 is coiled in a right-hand direction, whereby its upper end is adapted to be screwed upon the lower end of a threaded stud 55 which has opposite flat sides 56, and is supported in a flat-sided aperture 57 in the top plate 14 by means of a nut 58.

Thus, it will be seen that by twisting the nut 58 the spring 35 may be adjusted and the stud 55 will be thereafter prevented from turning in the aperture 57.

In order to prevent the stud 55 from becoming lost in the interior of the scale, as would occur if the nut 58 were accidentally turned so far as to become disengaged from the stud 55, said stud is provided with an unthreaded upper end 59, which is incapable of passing through the nut 58.

The upper portion of the nut 58 is provided with an unthreaded counterbore 60 which will permit a greater range of adjustment by allowing the upper end 59 of the stud 55 to pass downwardly a certain distance into the nut 58.

Accidental turning of the nut 58 will be prevented by means of a shallow hexagonal depression 61 which is adapted to serve as a seat for the hexagonal lower end of the nut 58 in the top plate 14. A conical coiled spring 62 is confined on the stud 55 between the lower surface of the top plate 14 and the upper end of the weighing spring 35, said spring 62 being concentric with the helical spring 35.

The lower side of the nut 58 will thus be retained resiliently in the depression 61 so that the adjustment of the weighing spring 35 cannot change unless the nut 58 is forcibly turned. The threads of the stud 55 are prevented from inter-engaging with the edges of the aperture 57 by a pair of guide flanges 63 which are turned downwardly from the edges of said aperture, so that the weighing spring 35 may be smoothly and accurately adjusted.

*Assembly*

In assembly, the scale pan 12 will first be secured to the upper end of the yoke legs 31, 32, by any desired means, and the pointer 51 will be secured to the outer end of the pointer arm 49 by heading over the end of the arm 49 at 52.

The reduced neck 53 will provide an important advantage in this operation, inasmuch as it provides abutments by means of which the arm 49 may be firmly supported to permit the heading operation.

The scale mechanism will then be assembled upon the L-shaped bracket 13 by inserting the pivot lugs 39, 40 of the plates 37, 38 in the pairs of ears 41, 42, and by inserting the pivot lugs 43, 44 in the apertures 45, 46, of the yoke 33. The resiliency of the parts is such that they may be readily sprung into place without the use of any additional pivot members or securing elements which would require further manipulation.

The threaded stud 55 will then be entered downwardly through the nut 58 and the aperture 57 of the top bracket plate 14, whereupon the conical spring 62 will be applied over the lower end of the stud 55 and secured thereon by threading the upper end of the helical weighing spring 35 upon the lower end of said stud. The lower end of the weighing spring 35 will then be engaged with the central hook 36 on the base of the yoke 33.

The casing side plates 18, 19 will then be applied and secured by bending the ears 20, 21, 22, whereupon the base 10 will be assembled by means of the ears 23, 24.

The scale plate 28 will then be assembled by passing the pointer 51 through the slot 50. This operation will be facilitated by the circular slot enlargement 54 which will permit the scale plate 28 to be turned 90 degrees and allow the passage of the pointer 51 directly through the slot 50. The slot enlargement 54 may be omitted if desired, since the scale plate 28 may be so tipped as to permit entry of the pointer 51 through the slot. The ears 29, 30 will then be employed to secure the scale plate 28 in position.

After the scale parts have been assembled, if it is found that the pointer arm 49 engages with one side of the slot 50 due to slight inaccuracies in the manufacture or the handling of the parts, the mechanism may be readily adjusted to bring the pointer arm 49 into proper alignment with said slot 50, whereby the arm 49 will move freely therein without contacting either side thereof.

This adjustment may be accomplished by means of any suitable pointed instrument inserted through one of the apertures 26, 27 in the base 10 behind the vertical back plate 15 of the bracket 13, whereby either edge of the plate 15 may be pried forwardly. The back plate 15 thus may be bent slightly, thereby swinging the pointer arm 49 to one side or the other depending upon which edge of the plate 15 is bent forwardly.

The weighing spring 35 will then be placed in proper adjustment by turning the nut 58, and the conical spring 62 will resiliently hold the nut 58 in the depression 61 so that it cannot turn accidentally. A scale plate 28, having suitable markings, will, of course, be used depending on the strength of the weighing spring 35.

One advantage of the improved weighing scale is that it may be made inexpensively entirely from sheet metal, excepting for the weighing spring and its supporting means.

Another advantage is that the fork plates 37, 38 may be stamped from flat sheet metal integrally with their pivot lugs and require no auxiliary pivot members.

Another advantage is that the upper and lower support plates 37, 38 may be cut from sheet metal by the use of the same die, merely by applying strip metal of difference widths to the die.

Another advantage is that the reduced neck 53 of the pointer arm 39 avoids the necessity of twisting the pointer arm in order to provide clearance in the slot 50, and also provides an abutment for the operation of forming the headed end 52 when securing the pointer 51.

Another advantage is that the means for supporting the weighing spring 35 is inexpensive to manufacture, reliable, and not likely to get out of order.

While there has been disclosed in this specification one form in which the invention may be embodied, it is to be understood that this form is shown for the purpose of illustration only, and that the invention is not to be limited to the specific disclosure, but may be modified and embodied in various other forms without departing from its spirit. In short, the invention includes all the modifications and embodiments coming within the scope of the following claim.

Having thus fully described the invention, what is claimed as new, and for which it is desired to secure Letters Patent, is:

In a weighing scale, a means for adjustably supporting a weighing spring including a top plate provided with an aperture therein having two oppoiste flat sides, a threaded stud in said aperture said stud having two opposite flat sides slidably engaged with the flat sides of said aperture, a nut on said stud above said top plate, said nut having a non-circular periphery there being a shallow depression in said top plate surrounding said aperture adapted to serve as a seat for said nut and having a shape similar to the nut, said threaded stud being incompletely threaded at its upper end, whereby said nut cannot become accidentally disengaged therefrom.

CLIFFORD G. HERBST.

REFERENCES CITED

The following references are of record in the file of this patent:

UNITED STATES PATENTS

| Number | Name | Date |
|---|---|---|
| 200,386 | Fredericks | Feb. 19, 1878 |
| 504,534 | Miller | Sept. 5, 1893 |
| 612,968 | Hansen | Oct. 25, 1898 |
| 632,525 | Hansen | Sept. 5, 1899 |
| 722,618 | Pelouze | Mar. 10, 1903 |
| 729,207 | Mulligan | May 26, 1903 |
| 749,497 | Pelouze | Jan. 12, 1904 |
| 749,498 | Pelouze | Jan. 12, 1904 |
| 752,874 | Triner | Feb. 23, 1904 |
| 821,035 | Hansen | May 22, 1906 |
| 1,289,885 | Osborn | Dec. 31, 1918 |